US006636408B2

(12) United States Patent
Pagliuca

(10) Patent No.: US 6,636,408 B2
(45) Date of Patent: Oct. 21, 2003

(54) COAXIAL TRANSMISSION LINE SURGE PROTECTOR ASSEMBLY WITH AN INTEGRAL FUSE LINK

(75) Inventor: Emanuel J. Pagliuca, Elgin, IL (US)

(73) Assignee: Marconi Communications, Inc., Cleveland, OH (US)

( * ) Notice: Subject to any disclaimer, the term of this patent is extended or adjusted under 35 U.S.C. 154(b) by 262 days.

(21) Appl. No.: 09/817,862

(22) Filed: Mar. 26, 2001

(65) Prior Publication Data

US 2002/0135963 A1 Sep. 26, 2002

(51) Int. Cl.[7] .................................................. H02H 1/00
(52) U.S. Cl. ....................................... 361/119; 361/120
(58) Field of Search ................................ 361/111, 117, 361/118–120, 124, 126–132

(56) References Cited

U.S. PATENT DOCUMENTS

| | | | | |
|---|---|---|---|---|
| 5,508,873 | A | 4/1996 | Knapp et al. | 361/119 |
| 5,566,056 | A | 10/1996 | Chaudhry | 361/117 |
| 5,657,196 | A | 8/1997 | Chaudhry et al. | 361/119 |
| 5,724,220 | A | 3/1998 | Chaudhry | 361/117 |
| 5,751,534 | A | 5/1998 | DeBalko | 361/119 |
| 5,790,361 | A | 8/1998 | Minich | 361/111 |
| 5,953,195 | A | 9/1999 | Pagliuca | 361/120 |
| 5,982,602 | A | 11/1999 | Tellas et al. | 361/119 |
| 6,317,307 | B1 * | 11/2001 | Bone et al. | 361/124 |

OTHER PUBLICATIONS

"Coaxial Surge Protector, Primary Surge Protector for Broadband Networks" Data Sheet; Joslyn Electronic Systems Company; 2 pgs, No Date.
"Tll In–Line Coaxial Lighting Surge Protectors"; Tii Industries, Inc. ©1999–2000;3 pgs, No Month.
"High Frequency Coaxial Surge Protectors P8AX Series"; 4 pgs, No Date.

* cited by examiner

*Primary Examiner*—Ronald W. Leja
(74) *Attorney, Agent, or Firm*—Jones Day

(57) ABSTRACT

A coaxial transmission line surge protector assembly is provided which includes a connector housing having an outer conductor surface for electrically coupling with the outer conductor of a coaxial transmission line. A housing inner conductor, for electrically coupling with the inner conductor of a coaxial transmission line, which includes a fuse link that becomes an open circuit when the current through the fuse link is greater than a current threshold. The protector assembly may further include a gas tube having first and second electrodes for electrically coupling with the outer and inner conductors of a coaxial transmission line. In addition, the protector assembly may include a fail-short clip having a first portion that is electrically coupled to the first electrode of the gas tube and a second portion that is electrically insulated from the second electrode of the gas tube by a dielectric.

9 Claims, 2 Drawing Sheets

COAXIAL TRANSMISSION LINE SURGE PROTECTOR ASSEMBLY WITH AN INTEGRAL FUSE LINK

FIELD OF THE INVENTION

The present invention relates to coaxial cable surge protectors, and more particularly to a surge protector/connector assembly that provides an integral fuse link.

BACKGROUND OF THE INVENTION

Telecommunications systems, such as cable television set-top boxes, Internet cable modems, and satellite TV receivers, are vulnerable to lightning surges and other fault conditions. Various types of surge protectors have been designed and manufactured for protecting coaxial transmission lines, and associated equipment, from damage due to transient voltage and current surges.

Coaxial based networks provide voice, video and data services to an increasing number of users. Broadband coaxial systems require surge protectors to handle current and voltage surges to protect personal and often expensive electronic equipment while not interfering with signal transmission.

Prior art surge protectors generally included separate components to protect against voltage and current surges. One type of prior art surge protector is a gas discharge tube connected between the inner conductor and the outer conductor of a coaxial cable. Such a surge protector protects against transient voltage surges.

Other surge protectors include a fail-short mechanism that protects against sustained voltage surges. Such mechanisms short the inner and outer conductors of a coaxial cable together when a voltage greater than a specified threshold persists on the coaxial cable (e.g., for 15 minutes), thus allowing the fail-short mechanism to conduct a fail-short current to ground.

Another prior art surge protector is a fuse element placed in series with a coaxial cable. Such a fuse protects against over-current conditions caused by lightning and/or electrical transients. When a current surge occurs, the fuse melts, creating an open circuit that protects the cable and the attached equipment from damage. Prior art fuse elements are external to coaxial cable connectors and/or protectors, generally comprised of a small gauge (thin) section of coaxial cable connected between a voltage surge protector and a coaxial cable transmission line.

Consequently, there is a need for an integral surge protector/coaxial cable connector that provides current surge protection and which is microwave transparent, simple to install, small in size, and inexpensive to manufacture. The claimed surge protector is designed to eliminate the need for an external over-current protector by providing a coaxial connector with an integral fuse link. The claimed design is less expensive to produce than non-integral designs. In addition, the claimed protector may further include components that prevent damage to a protected coaxial cable, and its associated electronic equipment, due to over-voltage conditions.

SUMMARY OF THE INVENTION

In one embodiment, a coaxial transmission line surge protector assembly is provided which includes a connector housing having an outer conductor surface for electrically coupling with the outer conductor of a coaxial transmission line. A housing inner conductor, for electrically coupling with the inner conductor of a coaxial transmission line, which includes a fuse link that becomes an open circuit when the current through the fuse link is greater than a current threshold.

In another embodiment, the protector assembly further includes a gas tube having first and second electrodes for electrically coupling with the outer and inner conductors of a coaxial transmission line.

In a further embodiment, the protector assembly includes a fail-short clip having a first portion that is electrically coupled to the first electrode of the gas tube and a second portion that is electrically insulated from the second electrode of the gas tube by a dielectric.

Additional novel features and advantages of the present invention will be set forth in part in the description that follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

The organization and manner of operation of the invention, together with further objects and advantages thereof, may best be understood by reference to the following description taken in connection with the accompanying drawings in which like reference numerals identify like elements, and in which.

While particular embodiments of the invention are shown and described in detail, it will be obvious to those skilled in the art that changes and modifications to the present invention, in its various embodiments, may be made without departing from the spirit and scope of the invention because these modifications and changes would be matters of routine engineering or design. As such, the scope of the invention should not be limited by the particular embodiments and specific constructions described herein but should be defined by the appended claims and equivalents thereof.

DETAILED DESCRIPTION OF THE INVENTION

Figure 1:
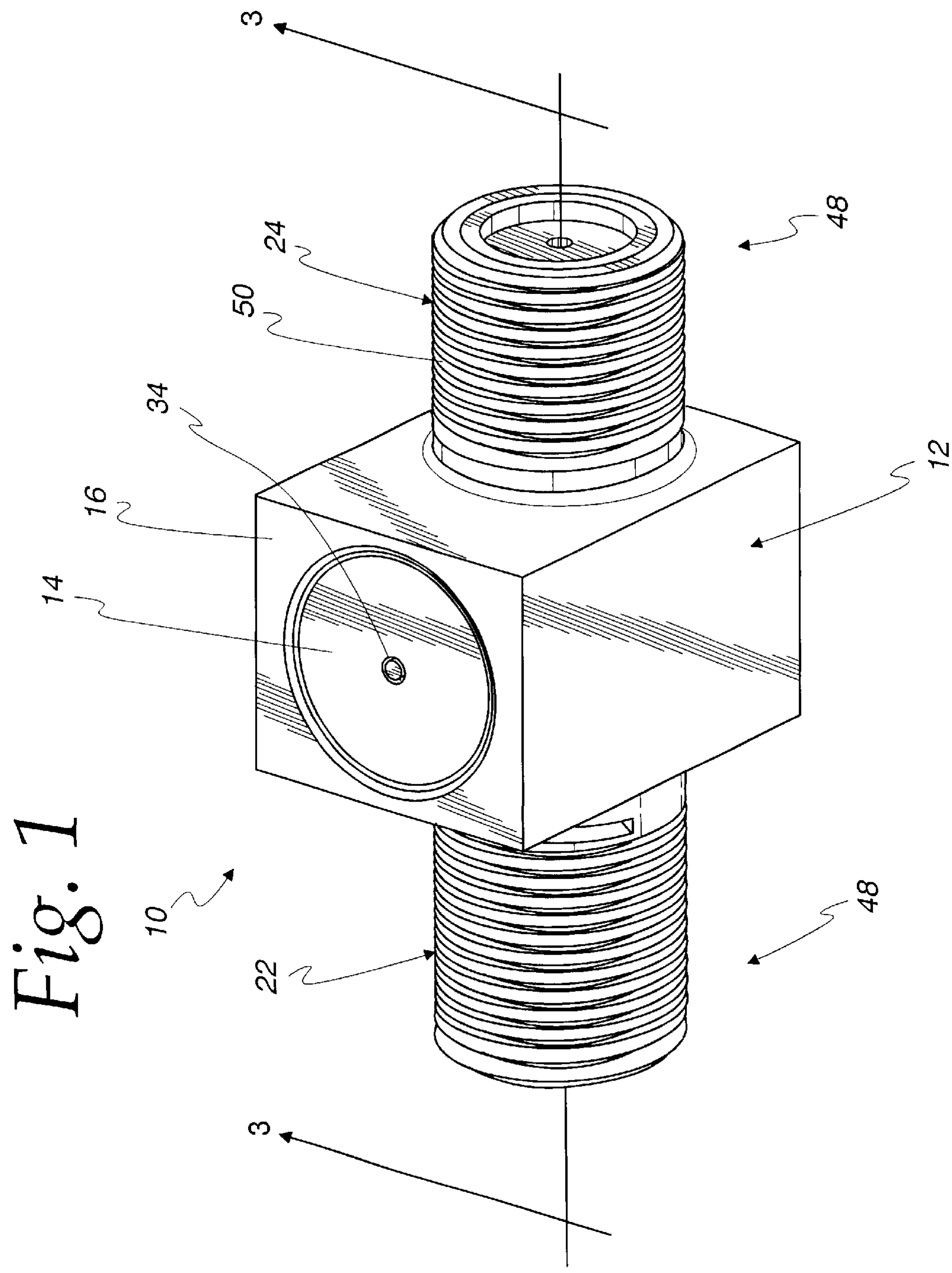
FIG. 1 is an isometric view of a surge protector assembly according to one embodiment of the present invention.

According to one embodiment of the invention, a surge protector assembly 10 for protecting a coaxial transmission line is shown in FIG. 1. The protector assembly 10 includes a connector housing 12. The connector housing 12 illustrated herein is an "F-F"-type connector body. This connector body is used to couple the connector housing 12 to the inner and outer conductors of a standard coaxial transmission line (not shown) to protect the transmission line and the attached electronic equipment from damage due to over-current and/or over-voltage conditions. While the "F—F"-type connector body is shown and described herein, other connector bodies may be substituted without departing from the scope of the claimed invention.

Figure 2:
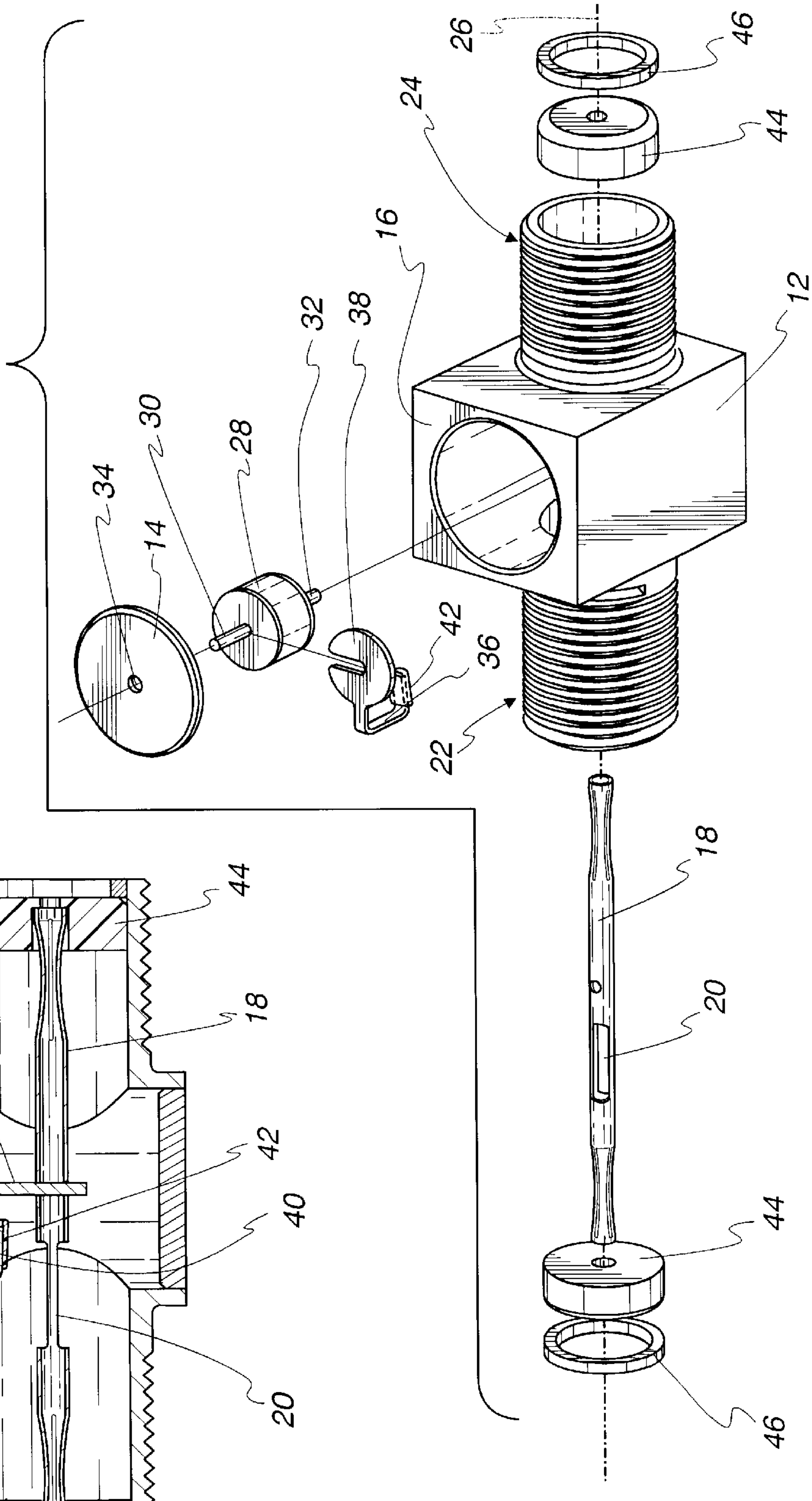
FIG. 2 is a an exploded isometric view of the surge protector assembly of FIG. 1.
Figure 3:
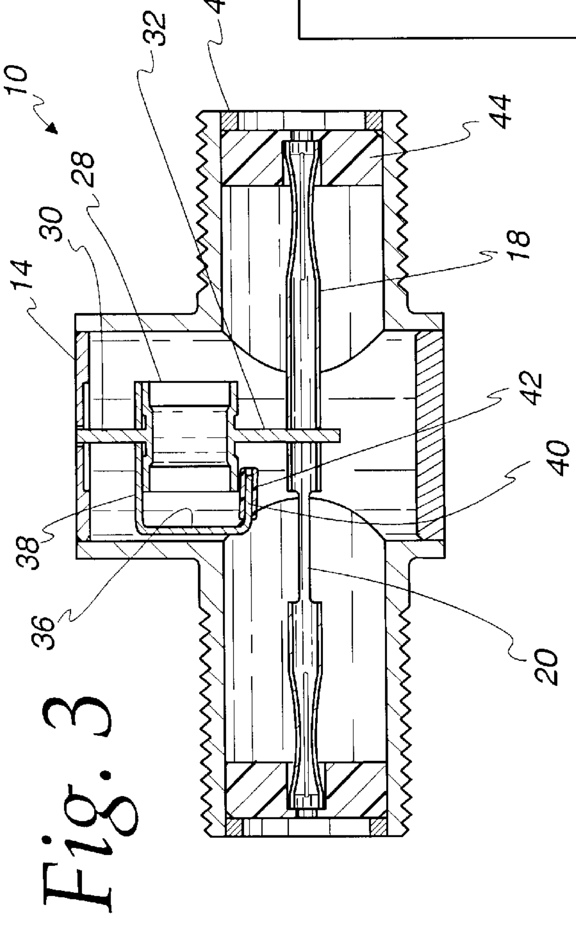
FIG. 3 is a cross-sectional elevation view of the surge protector assembly of FIG. 1 taken along line 3—3 in FIG. 1.

The protector assembly 10 shown in FIGS. 1–3 is designed for over-current and over-voltage surge protection in a 75 ohm coaxial transmission line with frequency ranges from 0 to 1 GHz. The protector assembly 10 is suited to protect many coaxial applications, including traditional Cable TV (CATV), broadband Hybrid-Fiber Coaxial (HFC), and Fiber-To-The-Curb (FTTC) networks using coaxial transmission lines. Minimal insertion loss makes the protector 156 assembly 10 microwave transparent (i.e., transparent to the coaxial network). The protector assembly 10 prevents damage to protected coaxial transmission lines and their associated electronic components and provides safety for maintenance personnel and network subscribers.

The connector housing 12 includes a removable retaining cap 14, an outer conductor surface 16, and a housing inner conductor 18 having a fuse link 20, as shown in FIG. 2. The connector housing 12 further includes first and second ends 22, 24 for connecting to first and second coaxial transmission lines (not shown). Each such coaxial transmission line includes an outer conductor and an inner conductor. When a coaxial transmission line is attached to the protector assembly 10, the outer conductor surface 16 is electrically coupled with the outer conductor of the coaxial transmission line. Likewise, the housing inner conductor is electrically coupled with the inner conductor of the attached coaxial transmission line. The connector housing 12 has a central longitudinal axis 26. The first and second ends 22, 24 are generally cylindrical and aligned to coincide with the longitudinal axis 26.

In another embodiment, the protector assembly 10 further includes a gas tube 28 having a first electrode 30 and a second electrode 32 extending therefrom. The first and second electrodes 30, 32 are comprised of a conductive material such as copper, silver, gold and/or a conductive alloy. The retaining cap 14 has an opening 34 therein for receiving the first electrode 30 and electrically coupling the first electrode 30 to the retaining cap 14. The retaining cap 14 is electrically and mechanically coupled to the outer conductor surface 16, as shown in FIGS. 1 and 3. The second electrode 32 is electrically coupled to the housing inner conductor 18, as shown in FIG. 3. The retaining cap 14 maintains the gas tube 28, and the other components to be described, within the connector housing 12.

In a further embodiment, the protector assembly 10 further includes a fail-short clip 36 having a first portion 38 that is electrically coupled to the first electrode 30 and a second portion 40 that is insulated from the second electrode 32 of the gas tube 28 by a dielectric 42, as shown in FIG. 3. The fail-short clip 36 is made of a conductive material such as copper, silver, gold and/or a conductive alloy. The fail-short clip 36 has a generally C-shaped cross-section. The first and second portions 38, 40 of the fail-short clip 36 correspond to the top and bottom portions, respectively, of the generally C-shaped cross-section, as shown in FIG. 3. The first and second portions 38, 40 of the fail-short clip 36 are generally parallel to each other and displaced a distance sufficient to receive the gas tube. This construction allows the fail-short clip 36 to resiliently maintain the gas tube 28 between the first and second portions 38, 40.

In one embodiment, the dielectric 42 is a dielectric sleeve that surrounds the second portion 40 of the fail-short clip 36, as shown in FIG. 3. However, the dielectric 42 may take any form so long as it insulates the second portion 40 from the second electrode 32 of the gas tube 28. For example, the dielectric 42 may be a dielectric ring disposed between the second electrode 32 of the gas tube 28 and the second portion 40 of the fail-short clip 36.

In another embodiment, the protector assembly 10 includes electrically insulative bushings 44 made of a dielectric material such as Teflon. The bushings 44 are disposed adjacent the housing inner conductor 18 and support the housing inner conductor 18 within the connector housing 12. Retaining rings 46 are placed outside of each bushing 44 to retain the housing inner conductor 18, and the other components, within the connector housing 12. As shown in FIG. 1, the first and second ends 22, 24 of the connector housing 12 each include a coaxial transmission line interface 48. Each interface 48 includes threads 50 on the outside surface of the respective end (22 or 24) that permit detachable engagement with a mating connector on a coaxial transmission line (not shown).

When the illustrated surge protector assembly 10 is connected to a coaxial transmission line, the three surge protection devices (the fuse link 20, the gas tube 28 and the fail-short clip 36) protect against current surges and over-voltage conditions.

In operation, the fuse link 20 of the housing inner conductor 18 becomes an open circuit when the current through the fuse link is greater than a predetermined current threshold. Specifically, the fuse link 20 creates an open circuit due to an over-current condition. For example, the fuse link becomes an open circuit when the current through the fuse link is greater than about 7 amps.

In one embodiment, the fuse link 20 allows the surge protector assembly 10 to carry at least the following current levels for at least the following time periods before becoming an open circuit: about 60 $A_{rms}$ for about 2.5 seconds, about 120 $A_{rms}$ for about 161 milliseconds, and about 350 $A_{rms}$ for about 43 milliseconds. In one embodiment, the fuse link 20 is a thin portion of the housing inner conductor 18, as shown in FIGS. 2–3. Thus, the fuse link 20 protects against current surges (greater than a predetermined threshold) that may occur in the inner conductor of a coaxial transmission line. When such an over-current condition arises, the fuse link 20 conducts the current which generates heat sufficient to melt the fuse link 20, causing an open circuit.

The gas tube 28 becomes a short circuit when the voltage between the first and second electrodes 30, 32 is greater than a predetermined voltage threshold (e.g., about 450 volts). The gas tube is shorted to ground due to a transient condition such as lighting. The gas tube 28 protects against relatively short duration voltage spikes (greater than a predetermined threshold) that may occur between the inner and outer conductors of a coaxial transmission line. When such a transient over-voltage condition arises, the gas in the gas tube 28 conducts causing a short circuit between the first and second electrodes 30, 32. Because the first electrode 30 is electrically coupled to the connector housing 12, the over-voltage is thus shorted to the connector housing 12, which is connected to ground.

The fail-short clip 36 becomes a short circuit when the voltage between the outer and inner conductors of a transmission line is greater than a predetermined voltage/current threshold for a sustained amount of time (e.g., about 480 $V_{ac}$ at 5 A for about 15 minutes). The fail-short clip 36 thus protects against a sustained over-voltage condition between the inner and outer conductors of a coaxial transmission line. When an over-voltage condition persists for a relatively long period of time, the gas tube 28 begins to breakdown and conduct current. The conducting current generates sufficient heat to melt the dielectric 42, causing the resilient fail-short clip 36 to contact the second electrode 32. This causes a short circuit between the first and second electrodes 30, 32 of the gas tube 28 thus causing a fail-short current to flow to the connector housing 12, which is connected to ground.

The protector assembly 10 is made using a minimal number of components thus reducing the cost of parts and labor required to build the assembly. The connector housing 12 and retaining cap 14 are made of a conductive material such as copper, silver, gold and/or a conductive alloy using an efficient and inexpensive process such as cold forming.

The present invention thus provides an integral surge protector/coaxial cable connector that provides current surge protection and which is microwave transparent, simple to install, small in size, and inexpensive to manufacture. This design eliminates the need for an external over-current protector by providing a coaxial connector with an integral fuse link. The claimed design is less expensive to produce than non-integral designs. In addition, the claimed protector may further include components that prevent damage to a protected coaxial cable, and its associated electronic equipment, due to over-voltage conditions.

While particular embodiments of the invention have been shown and described in detail, it will be obvious to those skilled in the art that changes and modifications to the present invention, in its various embodiments, may be made without departing from the spirit and scope of the invention because these modifications and changes would be matters of routine engineering or design. As such, the scope of the invention should not be limited by the particular embodiments and specific constructions described herein but should be defined by the appended claims and equivalents thereof.

What is claimed is:

1. A coaxial transmission line protector comprising:

a housing having three portions, two cylindrical shaped end portions for electrically coupling to the outer conductor of a coaxial transmission line, and a central portion between said end portions;

an integral inner conductor mounted within the two end portions and within the central portion, said inner conductor for electrically coupling to the inner conductor of the coaxial transmission line and being axially aligned therewith, said inner conductor having a fuse link formed by a portion of said inner conductor having a reduced cross section, and said inner conductor having another portion spaced from the fuse link wherein a hole is formed;

a gas tube located in the central portion of said housing and being disposed such that two electrodes of said gas tube extend generally perpendicular to a longitudinal axis of said inner conductor, a first electrode of said gas tube being received by said hole in said inner conductor and making electrical contact therewith and a second electrode of said gas tube extending away from said inner conductor to make electrical contact with said housing in said central portion of said housing;

a first insulative bushing mounted in one of said end portions of said housing; and a second insulative bushing mounted in the other of said end portions of said housing, said first and second bushings for mounting said inner conductor in said housing.

2. The apparatus as claimed in claim 1 including:

an electrically conductive clip directly attached to said gas tube.

3. The apparatus as claimed in claim 2 wherein:

said central portion of said housing includes an opening; and including a cap covering said central portion opening, said cap having a hole for receiving said second electrode of said gas tube.

4. The apparatus as claimed in claim 3 wherein:

said inner conductor is generally tubular in configuration;

said fuse link of said inner conductor includes an opening through said conductor wherein the amount of material at a cross section of said fuse link is substantially less when compared to the amount of material of said inner conductor at a cross section spaced from said fuse link.

5. The apparatus as claimed in claim 4 wherein:

said housing central portion is generally box shaped.

6. The apparatus as claimed in claim 5 wherein:

said clip has two arms that extend generally parallel to said longitudinal axis of said inner conductor.

7. The apparatus as claimed in claim 1 wherein:

said central portion of said housing includes an opening; and including a cap covering said central portion opening, said cap having a hole for receiving said second electrode of said gas tube.

8. The apparatus as claimed in claim 7 wherein:

said housing central portion is generally box shaped.

9. The apparatus as claimed in claim 1 wherein:

the inner conductor at said fuse link portion has a substantially reduced amount of material when compared to the inner conductor spaced from said fuse link portion, said fuse link portion having an axis aligned with the remainder of said inner conductor.

* * * * *